J. A. WARNER.
FRUIT HANDLING DEVICE.
APPLICATION FILED MAY 31, 1906.
980,371.
Patented Jan. 3, 1911.
2 SHEETS—SHEET 1.
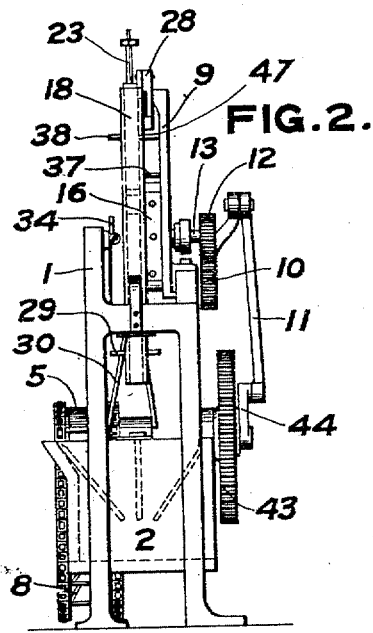
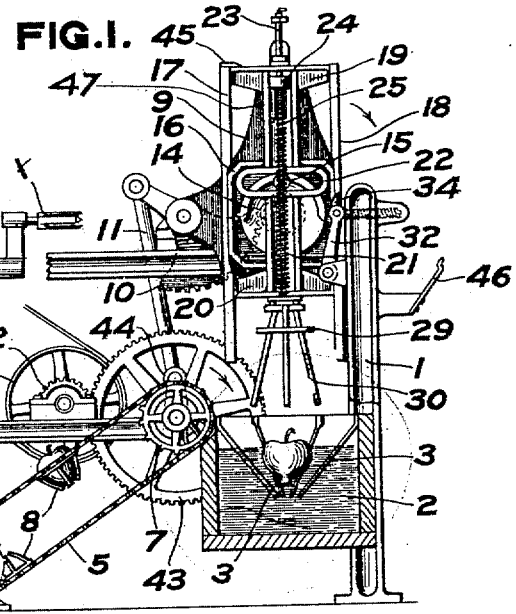
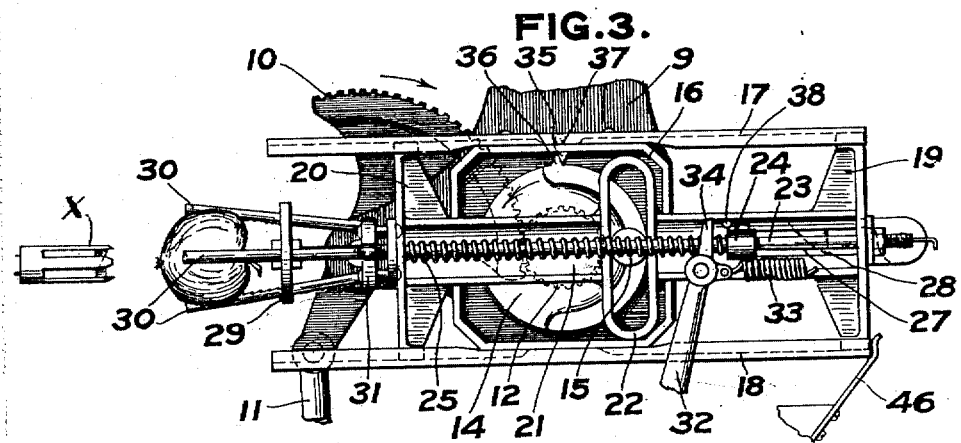
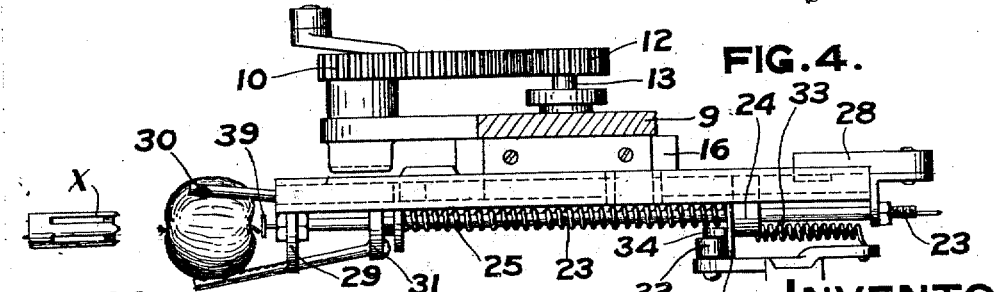
WITNESSES:
Clarence W. Carroll,
L. Thom.
INVENTOR
John A. Warner
by Byrd & Davis
his attys

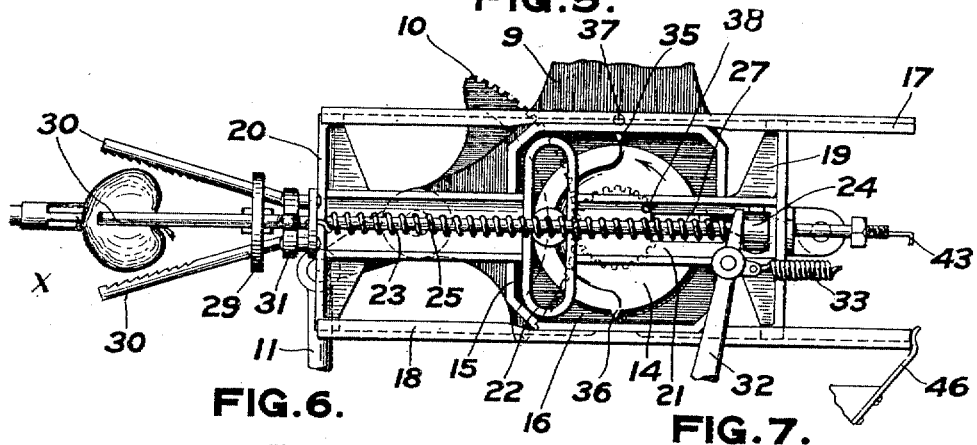
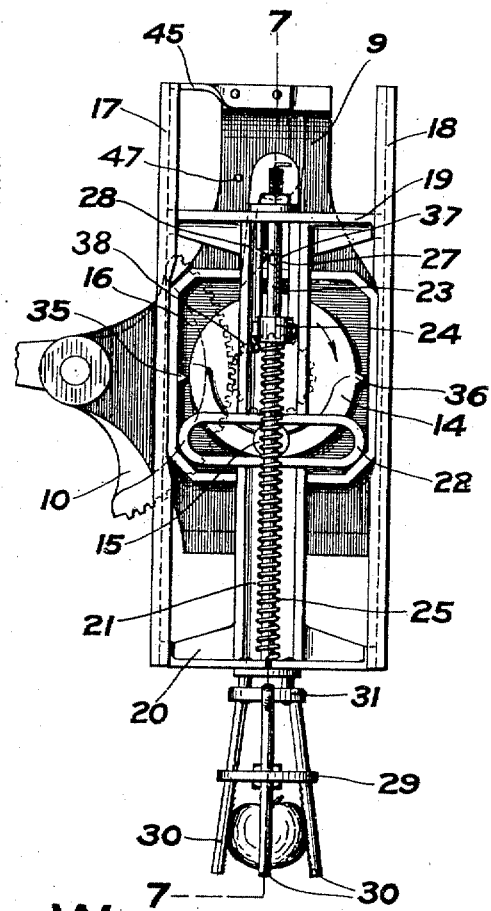
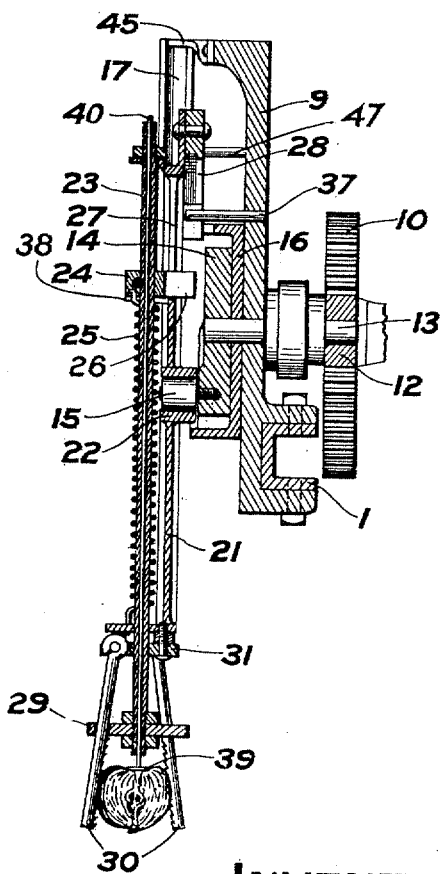

UNITED STATES PATENT OFFICE.

JOHN A. WARNER, OF ONTARIO, NEW YORK, ASSIGNOR TO FREEMAN PINTLER, OF ONTARIO, NEW YORK.

FRUIT-HANDLING DEVICE.

980,371. Specification of Letters Patent. Patented Jan. 3, 1911.

Application filed May 31, 1906. Serial No. 319,511.

*To all whom it may concern:*

Be it known that I, JOHN A. WARNER, a citizen of the United States, and resident of Ontario, in the county of Wayne and State of New York, have invented certain new and useful Improvements in Fruit-Handling Devices, of which the following is a specification.

This invention relates to devices for use in connection with machines for paring, coring, or otherwise operating upon apples and other fruit. In the case of apples, the line passing through the stem and blossom portions of the apple passes through the center of the core, and constitutes what may be called the core axis. In a paring machine the apple is turned around this core axis, and the coring of the apple is effected by removing from the apple a cylindrical piece, whose axis is the said core axis.

The object of the present invention is to produce a fruit handling device which shall operate automatically to insert fruit, such as apples, in a machine for paring, coring, or otherwise operating upon the fruit in a definite position required for the proper operation upon the fruit. This has always heretofore, so far as I am informed, been necessarily performed by hand, but I have discovered that certain fruits, and particularly apples, when floating in water, or other liquid, automatically assume a position in which the core axis is vertical, and I take advantage of this fact by using, in combination, a tank in which the fruit is floated and means operating automatically to seize the floating fruit and transfer it to the fork or other device upon which the fruit is impaled or held in the machine in question, the transferring operation being performed positively, so that the fruit is inserted in the machine in a position having a definite relation to that in which the fruit floats in the tank.

In the drawings:—Figure 1 is a side elevation of a machine embodying this invention, a portion being shown in section to exhibit interior construction; Fig. 2 is an end elevation of the same machine; Fig. 3 is an elevation of part of the same machine showing the parts in the position where an apple is ready to be forced upon the fork of a paring machine; Fig. 4 is a top plan view of the same parts, and in the same position, shown in Fig. 3; Fig. 5 is an elevation of the same parts shown in Figs. 3 and 4, but showing the apple released; Fig. 6 is an elevation of the same parts shown in Figs. 3 to 5 after having grasped an apple; and Fig. 7 is a section on the line 7—7 of Fig. 6.

The machine illustrated in the drawings has a suitable frame 1 supporting a tank 2 for water that is open at the top. The tank contains a series of converging fingers 3 forming a conical basket, having the lower portion thereof adapted to rest in water in the tank 2. The fingers are fastened at their upper ends to the upper edge of the tank. Means are provided for delivering fruit one by one into the basket so as to float freely in the water in the tank. As an instance of such means, there is shown a chute 4 whose end is closed by a belt 5 that passes around pulleys 6, 7. One or both of said pulleys may have teeth upon them, as shown, which pass into perforations or sockets in the belt 5 in order to prevent slipping of the belt upon the pulleys. The belt carries a series of pockets of a size adapted to take individual fruit and to carry the fruit along with the movement of the belt and to deliver the fruit in succession into the tank. In the present instance the pockets 8 are basket like and formed of open wire, which wire may, if desired, be more or less flexible and elastic in order to fit the fruit which drops into it. When a basket comes opposite the end of the chute 4, the fruit in said chute will drop into that basket, and is carried in the upwardly inclined direction, shown in Fig. 1, until finally it is discharged over the edge of the tank 2 into the basket 3. Thereupon the fruit, if an apple floating in the water, will quickly take a position of stable equilibrium with the above mentioned core axis vertical. Some times the blossom end, and some times the stem end, will be uppermost, but the core axis will be vertical, unless the apple is extremely deformed. Such deformed apples may easily be picked from the mass of apples that are put into the chute 4.

Means are provided for seizing the apple in the upright position just described and delivering it to other apparatus, such as coring, paring, slicing machines, or to any device in which it is desirable that the core axis of the apple shall have some relation to the action of the machine upon the apple.

In the present instance, the apple is to be delivered to a receiver, such as the fork X of a machine, such as a paring machine, and this fork is to be inserted into the apple so that the axis of the fork and the core axis of the apple will be substantially in line, and this is accomplished by seizing the apple, raising it from the tank, moving it to a delivering position and delivering it to the receiver.

The specific mechanism by which the fruit is seized in the tank and delivered to the receiver is the same as that illustrated in my copending divisional application Serial No. 459,626, filed October 26, 1908, and is not, therefore, claimed herein as a part of the present invention except insofar as concerns features having definite reference to the automatic positioning function of the device. This mechanism in the illustrated embodiment of the invention is constructed as follows.

Upon a suitable support 9 carried by the frame 1 is pivoted an oscillating toothed segment 10, operated by a link 11. The segment meshes with a pinion 12 on the back of said support, and the pinion is fixed on a shaft 13 projecting through said support, and carries also a crank plate 14 having upon it a crank pin 15. Around the axis of the shaft 13, and preferably supported upon said shaft, is a frame 16 carrying guiding means for the fruit holding device. These guiding means in the present form of the apparatus are a pair of guide ways 17 and 18 fastened to said frame 16. In the said guide ways 17 and 18 slides a frame of suitable form, in the present case consisting of cross heads 19 and 20 connected by a plate 21. The plate 21 comprises the loop or slot frame 22 in which rests the crank pin 15, so that by movement of said crank pin the frame is reciprocated in the guide ways. Longitudinally arranged on said frame is the fruit grasping mechanism, consisting of a rod 23 having upon it an adjustable collar 24. Around the rod 23 is coiled a spring 25 that is fastened at one end to the cross head 20, or to some other stationary portion of the reciprocating frame, and fastened at the other end to the collar 24. The collar 24 has a lug 26, Fig. 7, that projects through a slot 27 in the reciprocating frame above mentioned, and is adapted to engage and be held by a support on said frame. This support is a tilting hook 28 pivoted on the cross head 19, and which is adapted to engage and support the said collar when the parts are in the position shown in Figs. 1 and 5.

The rod 23 passes through the cross head 20, and on its end is a plate 29. Through perforations in this plate 29 pass three bars or jaws 30, whose upper ends are hinged to a stationary plate 31 carried by said cross head 20. The jaws 30 are so hinged as to move in planes radial to the extended axis of the rod 23. The points at which the ends of the jaws 30 are hinged to the plate 31 are nearer together than the points at which said jaws pass through the plate 29, and therefore longitudinal movement of the plate 29 will cause the jaws to open and to close. It will now be seen that when the lug 26 is engaged by the hook 28, the spring 25 will be extended and the jaws 30 will be opened to the positions shown in Fig. 5, but when the lug 26 is free from the hook 28, the spring 25 pulls the collar 24 and the rod 23 toward the cross head 20 and the parts will take the position shown in Figs. 3, 4, 6 and 7, in which the jaws are closed.

In order to move the collar 24 and lug 26 into the position of engagement with the hook 28, the following means are provided: To the frame 1 is pivoted a lever 32 pulled by a spring 33 that is stronger than the spring 25. The spring 33 is fastened at one end to the lever 32, and at the other end to said frame. The end of the lever 32 is a pivoted dog 34, which will permit a part to pass it when moving toward the right in Fig. 1, but will stop the same part after having made the movement just described and when the reverse movement is attempted. This is accomplished in the present form of the device by making the dog 34 a bell crank lever, as shown clearly in Figs. 3 and 5, and attaching the spring 33 to the arm thereof, the bell crank being pivoted to the end of the lever 32. Thus, when the spring 33 is not under heavy tension, the collar 24, moving toward the right in Fig. 3 tilts the dog 34 until the collar can pass it, so that the parts take the position shown in Fig. 3. If now the frame carrying the jaws 30 is moved toward the left in Fig. 3, and into the position shown in Fig. 5, the collar 24 will press against the dog 34 and will increase the tension of the spring 33, whereby, on account of the strength of said spring, the dog 34 will be held stationary and the collar 24 being held by said dog while the remainder of the frame moves toward the left, the hook 28 moves into engagement with the lug 26 until it latches therewith. This movement causes relative movement of the plates 29 and 31, and opens the jaws to the position shown in Fig. 5 for releasing a fruit that has been grasped by said jaws. Upon the frame 16, which is a part that rotates or tilts with the frame carrying the jaws, is a lug or stop 35, and upon the crank plate 14 is a lug 36 adapted to make contact with said stop 35. Upon a suitable portion of the frame, such as the support 9, is a pin 37, which, when the jaws 30 are in position to seize an apple floating in the tank 2 (see Figs. 6 and 7), makes contact with an angular face upon the latch or hook 28 and moves it from under the lug 26, thus releasing the collar 24 and permitting the spring 25 to pull the rod 23 and plate 29 downward into the position shown in said Figs. 6 and 7, thus closing the jaws 30 upon the apple.

The jaw frame carries a pin 38 for a purpose to be described.

Projecting from the lower side of the plate 29 is a movable plate 39 adapted to come in contact with an apple or fruit floating in the water and to press it downward if it is so small as to rise high in the jaws 30. This plate may be conveniently weighted and guided in its movement by supporting the plate upon a wire 40 which passes through a bore in the rod 23 and projects out from the upper end of said rod, and has means, such as an overturned end, for preventing the rod 23, and therefore the plate 39, from descending too far from the plate 29.

The number of teeth on the segment 10 with relation to the teeth on the pinion 12 is such as by movement of said segment in one direction to cause one turn and a quarter of said pinion 12.

Suitable driving means are provided for the segment 10 and for the belt 5, which may be, as shown in the present instance, a driving pulley 41 having a gear 42 meshing with a gear 43 upon the shaft of the pulley 7. The shaft of this same pulley carries a crank 44 which is attached to the lower end of the link 11. By this means the timing of the parts of the apparatus is accomplished, so that after an apple is dropped into the basket 3, the jaws 30 return to place and descend into said basket and grasp the apple. Then the jaws rise vertically from the basket carrying the apple, are tilted into the horizontal position in line with the fork X, force the apple on the fork, release the apple, withdraw in the horizontal line, tilt to the vertical position, and descend to grasp another apple, which in the meantime has been dropped into the basket 3 and has had sufficient time to find its position of stable equilibrium in the water.

A more detailed description of the operation of the machine is as follows:—Starting with the parts in the position shown in Fig. 1, the frame carrying the jaws is in the vertical position, and is held in that position by the catch plate 45. At the end of the return stroke to the position just mentioned, the frame 21 strikes a pin 47 on the support 9, which determines the vertical position of the jaw frame. The cross head 19 at the upper end of its stroke in the position shown in Fig. 1, lifts the latch 45 from engagement with the guide 17. The collar 24 is latched and retained by the hook 28, thus extending the spring 25 and opening the jaws 30. As the segment 10 swings upward, the crank pin 15 is turned, which lowers the jaws 30 until they surround the apple in the basket 3. At this time the parts are not quite in the position shown in Fig. 6, but at the lowest part of the downward stroke of the jaws the pin 37 releases the lug 26 from the hook 28 and the contraction of the spring 25 moves the plate 29 downward and causes the jaws 30 to close upon the apple. This is the position of Fig. 6. Continued upward movement of the segment 10 causes rotation of the plate 14, which lifts the cross heads 19, 20, and their connecting plate 21 (which constitutes part of the jaw carrying frame), and when the crank pin has reached its highest position shown in Fig. 1, the cross head 19 strikes the latch 45 and releases the frame therefrom, so that on the continued upward movement of the segment 10 the frame carrying the jaws is swung laterally or rocked until said frame takes the horizontal position shown in Fig. 3 with the lug 36 against the stop 35. As the frame reaches the horizontal position, the pin 38 on the frame drops behind the point of the lever 32, as shown in Figs. 3 and 4 and this is the position of complete upward oscillation of the segment 10. The frame carrying the jaws is held in the horizontal position by a spring catch 46 which holds the frame by friction but permits the horizontal reciprocatory movements described. The segment 10 now commences a return oscillation from the position of the parts shown in Fig. 3, and the rotation of the crank pin moves the jaw frame toward the left in said Fig. 3, thus tilting the lever 32 and extending its spring 33. This movement projects the jaw carrying frame toward the left until the apple held by the jaws is fastened upon the fork or other receiver X for the fruit. It will be noted that the fruit has been grasped and held by the jaws so that its core axis is kept in the same relative position with reference to the mechanism that carries it, so that if the core axis was vertical when the apple was grasped in the tank the core axis will be horizontal when brought into the position just described. It will be noted that while the jaw carrying frame has been moving toward the left under the influence of the crank pin, the spring 33 (which is stronger than the spring 25) has been considerably extended. At the limit of the stroke of the jaw carrying frame toward the left, the pin 38 slips over the point of the lever 34 and releases the lever, so that under the influence of the spring 33 it flies toward the right in Fig. 3, and pressing upon the collar 24 moves said collar until the lug 26 is caught by the hook 28. When this has occurred the upward movement of the segment 10 and the rotation of the crank pin continues until the projection or lug 36 strikes against the right hand face of the stop 35, and then by reason of this positive engagement the frame is released from the catch 46 and is tilted into the vertical position shown in Fig. 1.

As the frame reaches said vertical position it is caught and held by the catch 45. Thus the parts have been carried through the complete cycle of operations.

What I claim is:—

1. The combination of means for holding a fruit positively in a definite position during an operation thereon, a fruit receptacle adapted to hold liquid to float a fruit, and means constructed and operating to seize a fruit floating in the receptacle and transfer it positively to said fruit-holding means in a position having a definite relation to the position in which the fruit is seized.

2. The combination of a fruit-holding fork, a fruit receptacle adapted to hold liquid to float a fruit, and means constructed and operating to seize a fruit floating in the receptacle, transfer it positively to the fruit-holding fork in a position having a definite relation to the position in which the fruit is seized and to impale the fruit upon the fork.

3. The combination of means for holding a fruit positively in a definite position during an operation thereon, a fruit receptacle adapted to hold liquid to float a fruit, means constructed and operating to seize a fruit floating in the receptacle and transfer it positively to said fruit-holding means in a position having a definite relation to the position in which the fruit is seized, and means for feeding a single fruit to the fruit receptacle at each operation of the fruit-transferring means.

4. The combination of means for holding a fruit positively in a definite position during an operation thereon, a fruit receptacle adapted to hold liquid to float a fruit, means constructed and operating to seize a fruit floating in the receptacle and transfer it positively to said fruit-holding means in a position having definite relation to the position in which the fruit is seized, and means for governing automatically the depth of immersion of the fruit in the liquid at the moment of seizure.

JOHN A. WARNER.

Witnesses:
D. GURNEE,
C. W. CARROLL.